United States Patent [19]
Moiin

[11] Patent Number: 6,108,699
[45] Date of Patent: *Aug. 22, 2000

[54] SYSTEM AND METHOD FOR MODIFYING MEMBERSHIP IN A CLUSTERED DISTRIBUTED COMPUTER SYSTEM AND UPDATING SYSTEM CONFIGURATION

[75] Inventor: Hossein Moiin, San Francisco, Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/884,097

[22] Filed: Jun. 27, 1997

[51] Int. Cl.$^7$ .......................... G06F 15/177; G06F 15/173
[52] U.S. Cl. ..................... 709/221; 709/201; 709/222; 709/224; 709/226; 710/53; 710/261; 710/60; 710/260; 714/1; 714/41; 714/12; 714/736; 711/157; 711/152
[58] Field of Search ................ 710/53, 261, 60, 710/260, 241, 242, 240; 714/1, 41, 12, 736, 14, 4; 709/225, 226, 201, 221, 222, 224, 252; 707/8; 370/258; 711/157, 152

[56] References Cited

U.S. PATENT DOCUMENTS

| | | | |
|---|---|---|---|
| 4,825,206 | 4/1989 | Brice et al. | 340/825.02 |
| 5,062,055 | 10/1991 | Chinnaswamy et al. | 702/182 |
| 5,138,615 | 8/1992 | Lamport et al. | 370/94.3 |
| 5,216,675 | 6/1993 | Mellar-Smith et al. | 714/140 |
| 5,463,733 | 10/1995 | Forman et al. | 395/182.08 |
| 5,553,240 | 9/1996 | Madduri | 395/200.03 |
| 5,574,860 | 11/1996 | Perlman et al. | 709/220 |
| 5,692,120 | 11/1997 | Forman et al. | 395/182.08 |
| 5,805,785 | 9/1998 | Dias et al. | 395/182.02 |
| 5,822,531 | 10/1998 | Gorczyca et al. | 395/200.51 |
| 5,828,889 | 10/1998 | Moiin et al. | 395/728 |

FOREIGN PATENT DOCUMENTS

| | | | |
|---|---|---|---|
| 0 481 231 A2 | 4/1992 | European Pat. Off. | G06F 11/00 |
| 0 772 126 A2 | 5/1997 | European Pat. Off. | G06F 11/00 |

*Primary Examiner*—Le Hien Luu
*Assistant Examiner*—Beatriz Prieto
*Attorney, Agent, or Firm*—Conley, Rose & Tayon, PC; B. Noel Kivlin

[57] ABSTRACT

Multiple nodes can concurrently gain membership in a cluster of nodes of a distributed computer system by broadcasting reconfiguration messages to all nodes of the distributed computer system. In response to a reconfiguration request resulting from a node petitioning to join a cluster or a node leaving the cluster, each node determines to which nodes of the distributed computer system the node is connected, i.e., which are sending reconfiguration messages which the node receives. In addition, if multiple nodes fail substantially simultaneously, each node which continues to operate does not receive a reconfiguration message from each of the failed nodes and the failed nodes are omitted from the proposed new cluster. Thus, multiple simultaneous failures are processed in a single reconfiguration. Each of the member nodes of the proposed cluster determine the membership of the proposed cluster and broadcast a reconfiguration message to all proposed member nodes and collects similar messages. If all reconfiguration messages agree, the proposed cluster is accepted. In the case in which one or more nodes leave the cluster, quorum is established in the new cluster relative to the old cluster.

45 Claims, 10 Drawing Sheets

SYSTEM AND METHOD FOR MODIFYING MEMBERSHIP IN A CLUSTERED DISTRIBUTED COMPUTER SYSTEM AND UPDATING SYSTEM CONFIGURATION

FIELD OF THE INVENTION

The present invention relates to distributed computer systems and, in particular, to a particularly efficient mechanism by which membership in the distributed computer system can be determined in the presence of computer system failures.

BACKGROUND OF THE INVENTION

Distributed computers systems rival and even surpass processing capabilities of supercomputers which represented the state of the art even just a few years ago. Distributed computer systems achieve such processing capacity by dividing tasks into smaller components and distributing those components to member computers of the distributed computer system, each of which processes a respective component of the task while other member computers simultaneously process other components of the task. Larger distributed computer systems promise ever increasing processing capacity at ever decreasing cost.

While distributed computer systems provide excellent processing capacity, such systems are particularly susceptible to computer hardware and software failures. Distributed computer systems have multiple computers with multiple, redundant components such as processors, memory and storage devices, and system software and further include communications media connecting the multiple member computers of the distributed computer system. Failure of any of the many constituent components of the distributed computer system can result in unavailability of the distributed computer system. Accordingly, a very important component of any distributed computer system is the ability of the system to tolerate individual or multiple, simultaneous faults. Such fault tolerance of a distributed computer system makes such a system more reliable than most single computers. Specifically, failure of a substantial portion of the distributed computer system is tolerated and processing by the distributed computer system, while diminished in capacity, continues.

In general, distributed computer systems must meet a number of criteria to properly tolerate faults and to functional adequately. First, all constituent computers of the distributed computer systems, which are sometimes referred to as "nodes," must agree regarding which of the nodes are members of a cluster. A cluster is generally a number of nodes of a distributed computer system which collective cooperate to perform distributed processing. If nodes of a distributed computer system disagree as to the membership of the cluster, nodes can also disagree as to which nodes have a quorum and therefore have access to shared resources and data. The likelihood for simultaneous, inconsistent access of the shared resources and data; and therefore corruption of the data, is great. Second, no single-point failure within a cluster can result in complete unavailability of the cluster. Such susceptibility to failure is generally unacceptable. Third, nodes of a cluster which has a quorum are never in disagreement regarding the state of the cluster. A cluster which has a quorum has exclusive access to resources which the nodes of the cluster would otherwise share with other nodes of the distributed computer system. And fourth, isolated or faulty nodes of a cluster must be removed from the cluster in a finite period of time, e.g., one minute.

Some currently available distributed computer systems can tolerate at most one failure of any node or communications link of the system at one time and can tolerate consecutive failure of every node but one. The ability to tolerate multiple, simultaneous failures in a distributed computer system greatly improves the reliability of such a distributed computer system.

SUMMARY OF THE INVENTION

In accordance with the present invention, multiple nodes can join a cluster simultaneously. Specifically, one or more nodes petitioning to join the cluster each determine to which nodes of the distributed computer system the nodes are connected, i.e., which are sending messages which the petitioning nodes receive, regardless of membership of each such node in the current cluster. The petitioning nodes send a reconfigure message proposing a new cluster which includes as members all nodes to which the petitioning node is connected.

The proposed cluster can include as members nodes which are connected to the petitioning node and which are not members of the current cluster. Accordingly, more than one node can join the cluster in a single reconfiguration, thereby reducing the number of times a cluster must be reconfigured when multiple nodes are ready to join the cluster substantially simultaneously. Such is possible if multiple nodes are unavailable due to failure of a single communications link which is subsequently revived. Each node receiving the reconfigure message, referred to as a petitioned node, similarly determines all other nodes to which the node is connected and responds with reconfigure message which proposes a respective new cluster including all such nodes. The petitioning and petitioned nodes collect all reconfiguration messages and, if all the reconfiguration messages unanimously propose the same proposed cluster, the proposed cluster is accepted as new. Thus, unanimous agreement as to the membership of the cluster is assured.

Further in accordance with the present invention, multiple nodes can leave a cluster simultaneously. Failure to receive messages from a particular node in a predetermined period is detected as a failure of the node. In response to the detected failure, the node detecting the failure sends a reconfigure message. Each node receiving the reconfigure message broadcasts in response thereto a reconfigure message to all nodes and determines from which nodes a reconfigure message is received. Thus, each node determines to which other nodes the node is operatively connected and configures a proposed new cluster which includes as members the connected nodes. If multiple nodes fail substantially simultaneously, each node which continues to operate does not receive any messages from each of the failed nodes and the failed nodes are omitted from the proposed new cluster. Thus, multiple simultaneous failures are processed in a single reconfiguration.

Since the failure of a node can be either a failure of the nodes itself or the communications link connecting the node to the remainder of the distributed computer system, the proposed new cluster is not accepted as the new cluster unless the proposed new cluster can establish a quorum relative to the previous member of the cluster. If the previous cluster had only two member nodes, quorum is established by a race mechanism. If the two member nodes of the previous cluster do not share a quorum device, an alternative mechanism is used to establish quorum. If the previous cluster had more than two member nodes, quorum is established by a vote mechanism in which one of the member nodes of the previous cluster is designated the crown prince to resolve quorum votes which result in a tie.

Accordingly, a distributed computer system in accordance with the present invention can tolerate simultaneous failure of up to one-half of the member nodes of a cluster. Failure of more than one-half of the member nodes of the cluster prevent the cluster from achieving a quorum. However, since quorum is established relative to the previous membership of the cluster and not relative to all nodes of the distributed computer system, the distributed computer system can tolerate a series of multiple-node failures as long as each multiple-node failure includes failure of no more than one-half of the nodes surviving the previous multiple-node failure until only one node remains operative. The distributed computer system according to the present invention is therefore particularly robust and improves significantly the likelihood that the functionality provided by the distributed computer system will continue to be provided despite multiple simultaneous, or a series of multiple simultaneous, failures.

DETAILED DESCRIPTION

In accordance with the present invention, membership in a cluster of nodes in the distributed computer system is determined in a way which permits multiple nodes to simultaneously join or leave the cluster. As a result, the distributed computer system continues to provide service in spite of multiple simultaneous node failures.

Figure 1:
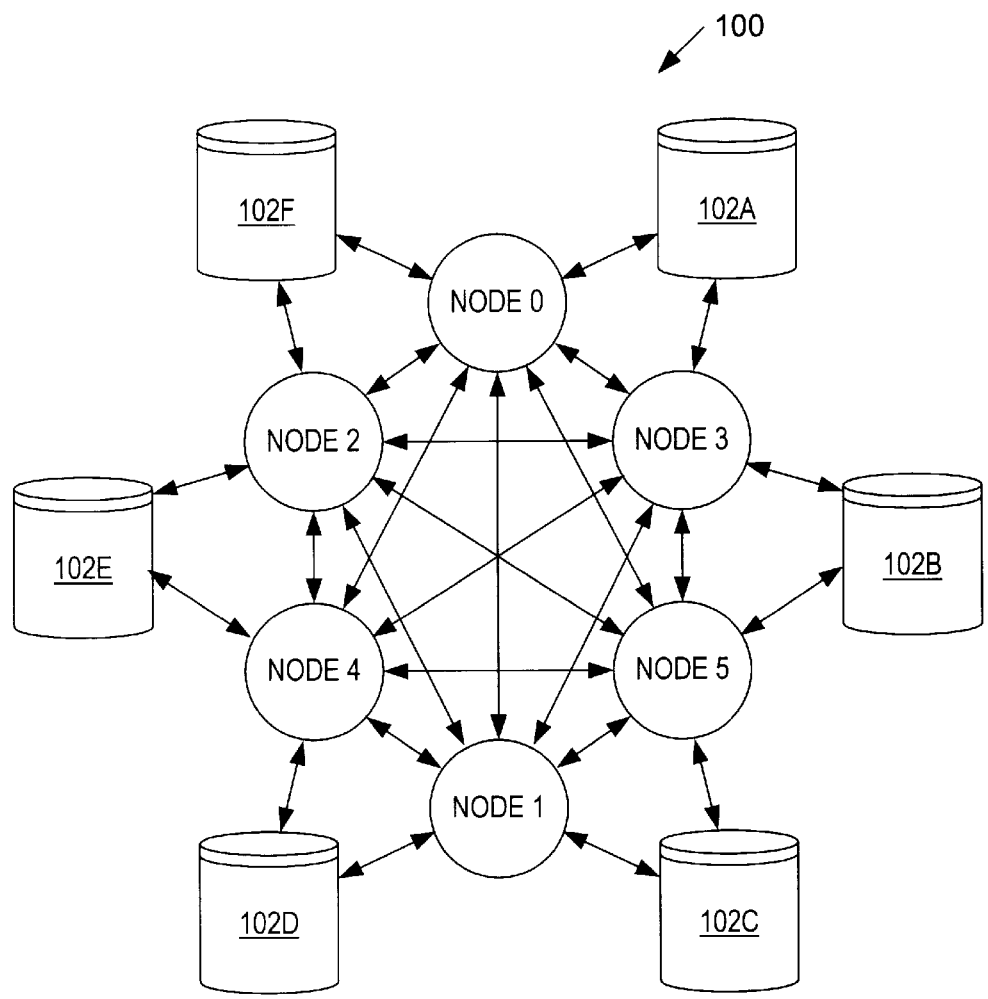
FIG. 1 is a block diagram of a distributed computer system in accordance with the present invention.

FIG. 1 shows an illustrative example of a distributed computer system 100 which includes nodes 0–5. Nodes 0–5 are fully interconnected, i.e., distributed computer system 100 includes a direct communications link between each of nodes 0–5 and each other of nodes 0–5. Distributed computer system 100 also includes a number of storage devices 102A–F, each of which serves as a quorum device in one embodiment. Storage device 102A is connected between and shared by nodes 0 and 3. Storage device 102B is connected between and shared by nodes 3 and 5. Storage device 102C is connected between and shared by nodes 5 and 1. Storage device 102D is connected between and shared by nodes 1 and 4. Storage device 102E is connected between and shared by nodes 4 and 2. Storage device 102F is connected between and shared by nodes 2 and 0. Nodes 0–5 are described in greater detail below.

Cluster membership is determined by each of nodes 0–5 individually in such a manner that each node arrives at the same result and multiple, simultaneous failures are detected and properly handled. Each of nodes 0–5 includes a cluster membership monitor (CMM) which is a computer process executing within each of nodes 0–5. To facilitate appreciation of the present invention, a number of hardware components of nodes 0–5, and therefore the operating environment for each of the CMMs, are described.

Figure 2:
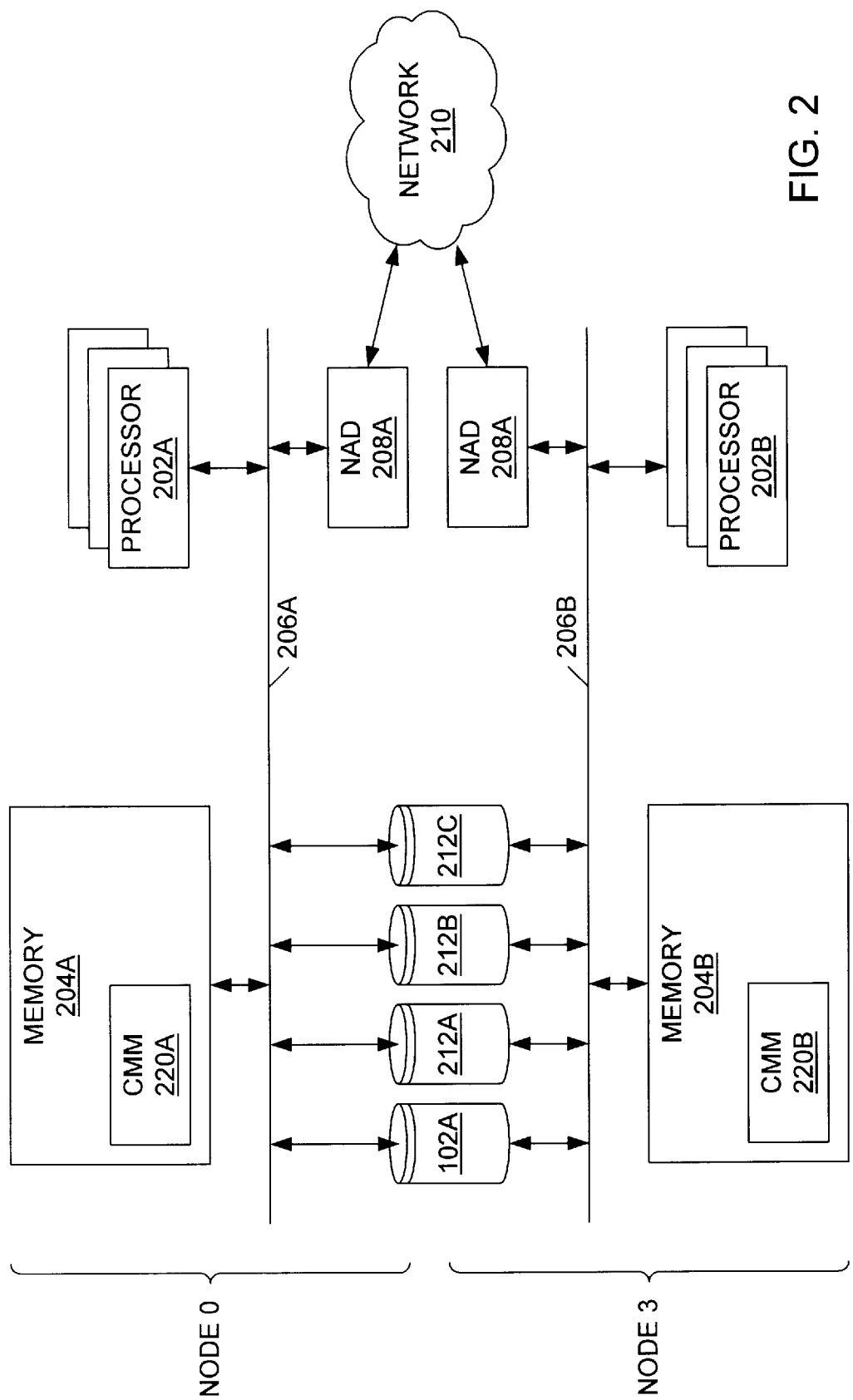
FIG. 2 is a block diagram of two nodes of the distributed computer system of FIG. 1 which share a number of devices and each of which includes a cluster membership monitor in accordance with the present invention.

FIG. 2 shows nodes 0 and 3. Each of nodes 1–5, including node 3, are directly analogous to node 0 and the following description of node 0 is equally applicable to each of nodes 1–5. Node 0 includes one or more processors 202A, each of which retrieves computer instructions from memory 204A through an interconnect 206A and executes the retrieved computer instructions. In executing retrieved computer instructions, each of processors 202A can retrieve data from and write data to memory 204A and any and all of shared storage devices 102A and 212A–C through interconnect 206A. Interconnect 206 can be generally any interconnect mechanism for computer system components and can be, e.g., a bus, a crossbar, a mesh, a torus, or a hypercube. Memory 204A can include any type of computer memory including, without limitation, randomly accessible memory (RAM), read-only memory (ROM), and storage devices which use magnetic and/or optical storage media such as magnetic and/or optical disks. Shared storage devices 102A and 212A–C are each a storage device or an array of storage devices which can be simultaneously coupled to two or more computers. As shown in FIG. 2, each of shared storage devices 102A and 212A–C is coupled both to interconnect 206A of node 0 and to interconnect 206B of node 3. Each of shared storage devices 102A and 212A–C is accessed by each of nodes 0 and 3 as a single device although each of shared storage devices 102A and 212A–C can be an array of storage devices. For example, any of shared storage devices 102A and 212A–C can be a SPARC Storage Array available from Sun Microsystems, Inc. of Mountain View, Calif.

Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Each of shared storage devices 102A and 212A–C can be reserved by either node 0 or node 3. For example, any of processors 202A can issue control signals through interconnect 206A to shared storage device 212C which cause reservation of storage device 212C. In response to the control signals, shared storage device 212C determines whether shared storage device 212C is already reserved as represented in the physical state of shared storage device 212C, e.g., in the state of a flag or an identification of the holder of the current reservation as represented in a register of shared storage device 212C. If shared storage device 212C is not currently reserved, shared storage device 212C changes its physical state to indicate that shared storage device 212C is now reserved by node 0. Conversely, if shared storage device 212C is currently reserved, shared storage device 212C sends through interconnect 206A to processors 202A signals which indicate that the attempted reservation is refused.

In addition, each of processors 202A can issue control signals to a network access device 208A which cause network access device 208A to transfer data through network 210 between network access device 208A of node 0 and network access device 208B of node 3 in a conventional manner. Network 210 includes all of the communications links between nodes 0–5 shown in FIGS. 1 and 2. In one embodiment, network 210 (FIG. 2) is the well-known Ethernet network and network access devices 208A and 208B are conventional Ethernet controller circuitry.

Figure 3:
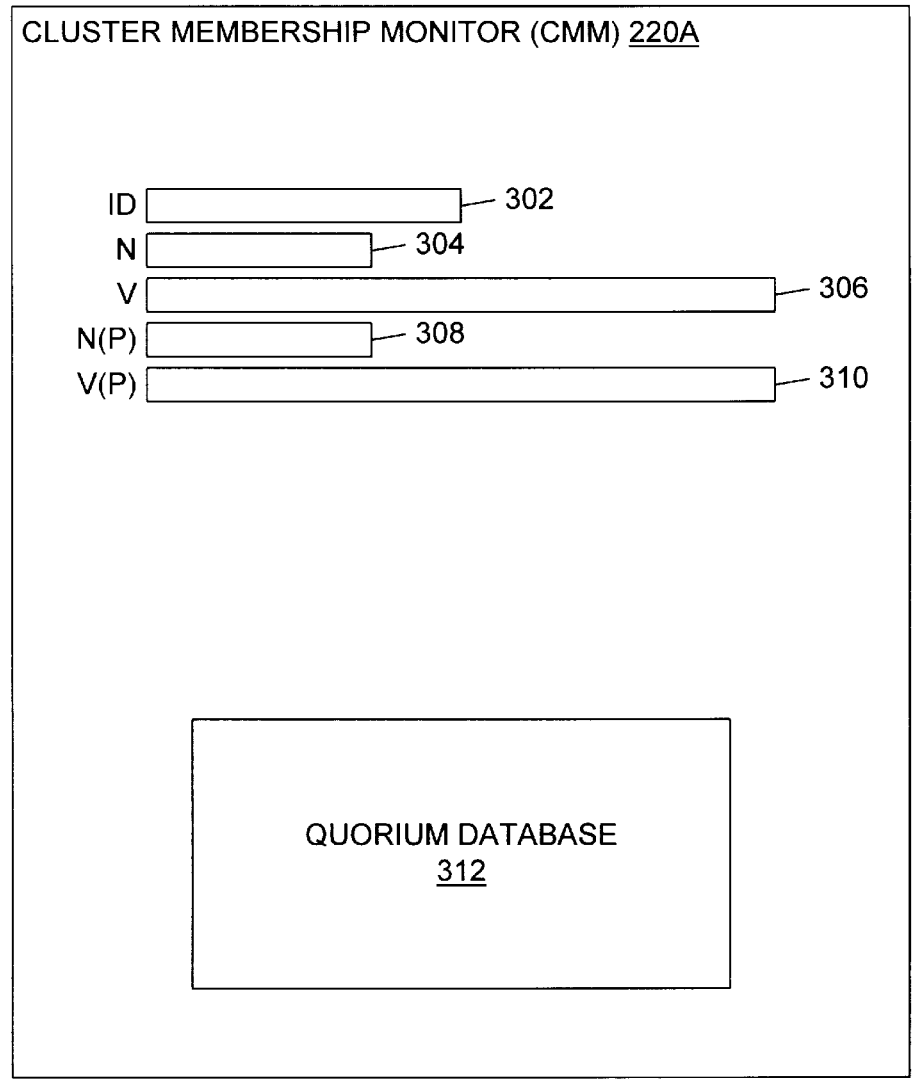
FIG. 3 is a block diagram of a cluster membership monitor of FIG. 2.

Node 0 includes a cluster membership monitor (CMM) 220A which is a computer process executing in processors 202A from memory 204A. CMM 220A implements a state automaton which includes representation of the state of node 0 with respect to distributed computer system 100 (FIG. 1) and of a current cluster of distributed computer system 100. CMM 220A is shown in greater detail in FIG. 3 and includes a number of fields which collectively represent the state of a cluster of nodes 0–5 (FIG. 1). A field is data which collectively represent a component of information. Specifically, CMM 220A (FIG. 3) includes an identification field 302, a cluster size field 304, a cluster vector field 306, a next cluster size field 308, and a next cluster vector field 310.

Identification field 302 includes data which uniquely identifies node 0 and distinguishes node 0 from nodes 1–5 (FIG. 1). The data stored in identification field 302 (FIG. 3) are sometimes collectively referred to herein as the identifier of node 0. Cluster size field 304 (FIG. 3) includes data which specify a number of nodes included in the cluster to which node 0 is a member. Cluster vector field 306 includes data which identify each member node of the cluster to which node 0 is a member. Accordingly, cluster vector field 306 includes the identifier of node 0 and can include the identifiers of each of nodes 1–4 (FIG. 1). Next cluster size field 308 and next cluster vector field 310 collectively represent a state of a prospective cluster during reconfiguration as described below and are analogous to cluster size field 304 and cluster vector field 306, respectively.

Figure 4:
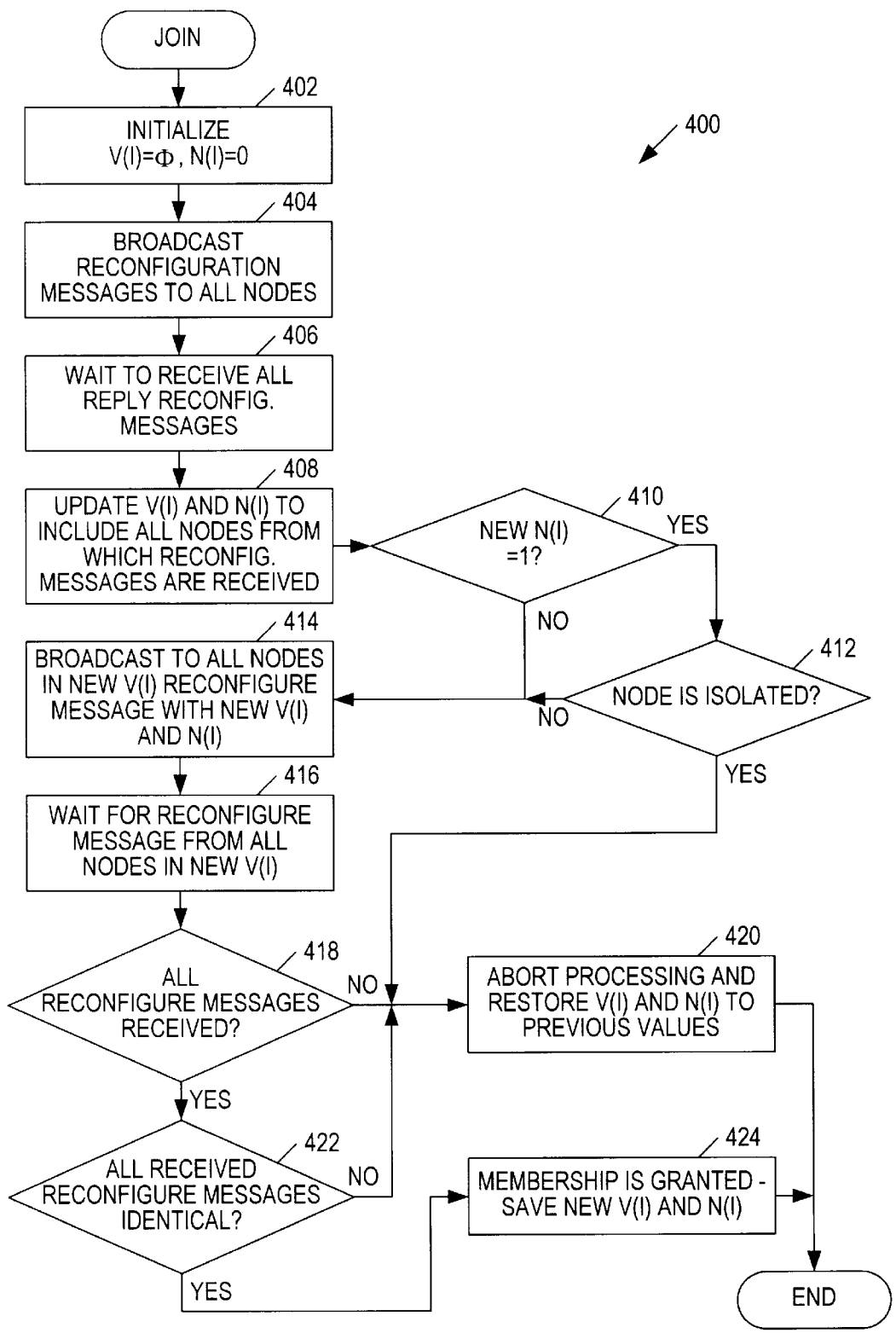
FIG. 4 is a logic flow diagram illustrating the petitioning of a node to join a cluster in the distributed computer system of FIG. 1 in accordance with the present invention.

When CMM 220A (FIG. 2) of node 0 is initialized, CMM 220A attempts to join a cluster which includes any of nodes 1–5 (FIG. 1) according to the steps of logic flow diagram 400 (FIG. 4). Processing according to logic flow diagram 400 begins in step 402 in which CMM 220A (FIG. 3) initializes cluster size field 304 to zero and cluster vector field 306 to represent an empty set to indicate that no nodes are currently a member of the current cluster. Processing transfers to step 404 (FIG. 4) in which CMM 220A (FIG. 3) broadcasts a reconfiguration message to nodes 1–5. A reconfiguration signal generally includes a message type field which indicates that the message is a reconfiguration message and includes the identifier of the node sending the reconfiguration message and the cluster size and vector fields of the node sending the reconfiguration message. CMM 220A broadcasts the reconfiguration message to all nodes which are potentially members of a new cluster, i.e., to nodes 1–5 (FIG. 1), regardless of each node's membership in any current clusters.

In step 406 (FIG. 4), to which processing transfers from step 404, CMM 220A (FIG. 3) waits for a predetermined period of time to receive reconfiguration messages from nodes 1–5. In one embodiment, the predetermined period of time is thirty seconds. As described in more detail below with respect to step 504 (FIG. 5), each member node of a cluster responds to a reconfiguration message received from a non-member node by broadcasting a responding reconfiguration message. By waiting to receive reconfiguration messages from all nodes, CMM 220A (FIG. 3) determines which, if any, of nodes 1–5 are operative and in communication with node 0. When CMM 220A has received reconfiguration messages from all of nodes 1–5 or when the predetermined period of time has expired, whichever occurs first, processing transfers to step 408 (FIG. 4). In step 408, CMM 220A (FIG. 3) updates next cluster size field 308 and next cluster vector 310 to represent a cluster which includes node 0 and all nodes from which CMM 220A receives a reconfiguration message in step 406 (FIG. 4). Thus, in steps 406 and 408, CMM 220A (FIG. 3) builds a prospective cluster which includes all nodes which appear to be operative and properly connected to node 0.

It should be noted at this point that multiple nodes can join a cluster in a single reconfiguration. For example, node 2 (FIG. 1) can perform the steps of logic flow diagram 400 (FIG. 4) while node 0 performs the steps of logic flow diagram 400 concurrently and independently. Accordingly, reconfiguration messages broadcast by nodes 0 and 2 in independent, analogous performances of step 404 (FIG. 4) are received by nodes 0 (FIG. 1) and 2 in independent, analogous performances of step 406 (FIG. 4). Accordingly, nodes 0 and 2 include each other in a prospective new cluster in independent, analogous performances of step 408 (FIG. 4).

In test steps 410 (FIG. 4) and 412, CMM 220A (FIG. 3) determines whether the prospective cluster is proper. Specifically, in test step 410 (FIG. 4), CMM 220A (FIG. 3) compares the cluster size represented in cluster size field 304 to a value of one to determine whether any node other than node 0 is a member of the prospective cluster. If the cluster size is greater than one, processing transfers to step 414 (FIG. 4) which is described below. Conversely, if the cluster size is not greater than one, processing transfers to test step 412.

In test step 412, CMM 220A (FIG. 3) determines whether node 0 is isolated, i.e., whether all communications links between node 0 and other nodes of distributed computer system 100 (FIG. 1) have failed. If node 0 is not isolated but is instead the sole member of a cluster, node 0 can safely participate in competitions for quorum, which are described more completely below, and other nodes can subsequently join the cluster of which node 0 is the sole member. It is generally preferred to prevent isolated nodes from operating on shared data since such presents a substantial risk that such data will become corrupted by the isolated node or other nodes which are not in communication with the isolated node. However, a node which is the sole member of a cluster is permitted to continue processing.

From the perspective of CMM 220A (FIG. 2) of node 0, isolation of node 0 and exclusive membership in a single-node cluster are indistinguishable. In one embodiment, the determination regarding whether node 0 is isolated requires human intervention. A human operator generally provides data, through physical manipulation of user input devices (not shown) of node 0 using conventional techniques, which indicates whether node 0 is isolated. The data can be provided before hand and stored in a node configuration field (not shown) from which CMM 220A (FIG. 3) retrieves the data. Alternatively, the operator can be prompted to provide the data by CMM 220A using conventional user-interface techniques. If node 0 is isolated, processing transfers from test step 412 (FIG. 4) to step 420 in which node 0 fails to join a cluster and CMM 220A (FIG. 3) aborts processing in the manner described more completely below. Conversely, if node 0 is not isolated, node 0 proceeds to form a cluster to which node 0 is the sole member and processing transfers to step 414 (FIG. 4).

Figure 5:
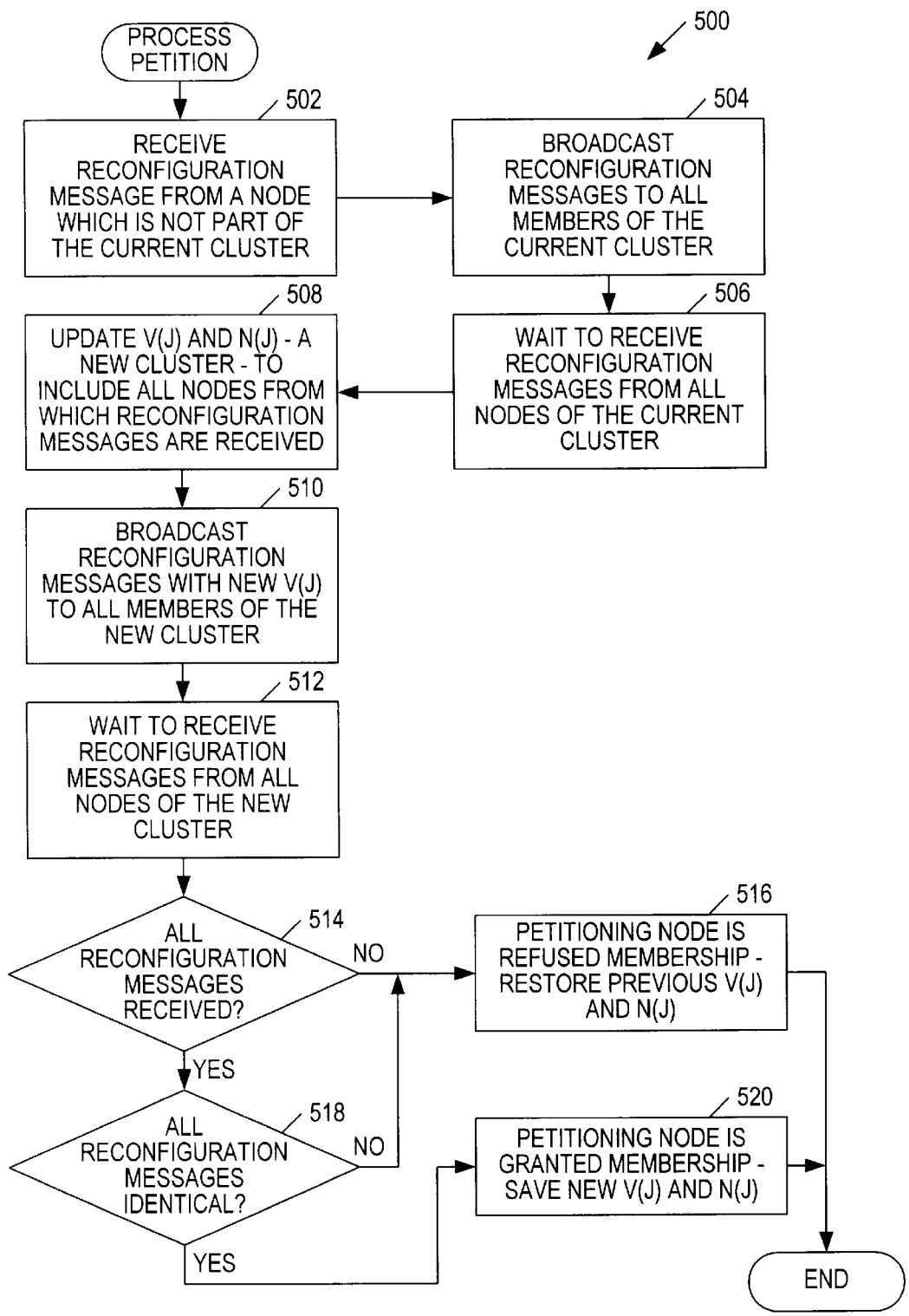
FIG. 5 is a logic flow diagram illustrating the processing of nodes in response to the petitioning shown in FIG. 4 to determine membership in a new cluster in accordance with the present invention.

In step 414, CMM 220A (FIG. 3) requests a reconfiguration of the current cluster of distributed computer system 100 (FIG. 1) by broadcasting a reconfiguration message which includes the prospective cluster size and vector represented in next cluster size field 308 (FIG. 3) and next cluster vector field 310. CMM 220A broadcasts the reconfiguration message to each of nodes 1–5 which is identified in next cluster vector 310. In the context of logic flow diagram 400 (FIG. 4), each such node is referred to as a petitioned node. Processing transfers to step 416 (FIG. 4) in which CMM 220A (FIG. 3) waits for a predetermined period of time to receive reconfiguration messages from all petitioned nodes. In one embodiment, the predetermined period of time is thirty seconds. The manner by which a petitioned node receives a reconfiguration message from CMM 220A of node 0 and replies with another reconfiguration message is described more completely below with respect to logic flow diagram 500 (FIG. 5). When CMM 220A (FIG. 3) receives a reconfiguration message from each petitioned node or when the predetermined period of time expires, which ever occurs first, processing of CMM 220A transfers to test step 418 (FIG. 4).

In test step 418, CMM 220A (FIG. 3) determines whether reconfiguration messages have been received from all petitioned nodes. If CMM 220A fails in step 416 to receive a reconfiguration message from any of the petitioned nodes, processing transfers from test step 418 to step 420 and the reconfiguration fails. In step 420, CMM 220A (FIG. 3) aborts processing and does not update cluster size field 304 and cluster vector field 306 to represent the prospective cluster. After step 420, processing according to logic flow diagram 400 (FIG. 4) terminates.

Conversely, if CMM 220A (FIG. 3) determines in test step 418 (FIG. 4) that reconfiguration messages from all petitioned nodes are received in step 416, processing transfers to test step 422. In test step 422, CMM 220A (FIG. 3) compares the received reconfiguration messages to determine whether all the received reconfiguration messages represent exactly the same cluster, i.e., whether all received reconfiguration messages agree as to cluster membership in the prospective cluster. If any of the received reconfiguration messages do not agree as to cluster membership, processing transfers from test step 422 (FIG. 4) to step 420 in which the reconfiguration of the cluster fails in the manner described above. Conversely, if all received reconfiguration messages agree as to membership in the prospective cluster, processing transfers from test step 422 to step 424. In step 424, the prospective cluster is accepted and node 0 saves the prospective cluster as the current cluster by copying data from next cluster size field 308 (FIG. 3) and next cluster vector field 310 to cluster size field 304 and cluster vector field 306, respectively. After step 424 (FIG. 4), processing according to logic flow diagram 400 terminates.

Thus, a new cluster configuration is negotiated by broadcasting a reconfiguration message to all available node over all available communications links and receiving confirmation from each petitioned node. It is noted that broadcasting reconfiguration messages to all available nodes over all available communications links imposes a relatively heavy burden on distributed computer systems with a large number of nodes. However, reconfiguration of a cluster of the nodes should be a relatively infrequent occurrence since each node and each communications link is preferably relatively stable and reliable.

Logic flow diagram 500 (FIG. 5) illustrates the processing of a petitioned node in response to receipt of a reconfiguration message when no reconfiguration is in progress. All nodes receiving the reconfiguration message perform the steps of logic flow diagram 500 generally concurrently and independently. As described above, all of nodes 0–5 are generally analogous to one another. Therefore, the following description of logic flow diagram 500 in the context of node 0 is equally applicable to performance of the steps of logic flow diagram 500 by any other petitioned ones of nodes 0–5 (FIG. 1). In the context of logic flow diagram 500, node 0 is the petitioned node and the one of nodes 1–5 which sends the reconfiguration message, e.g., node 1, is referred to as the petitioning node. Processing according to logic flow diagram 500 begins in step 502 (FIG. 5).

In step 502, CMM 220A (FIG. 3) of the petitioned node, e.g., node 0, receives the reconfiguration message from the petitioning node. CMM 220A ascertains that the reconfiguration message is a petition to join the current cluster by determining that the petitioning node, i.e., the source of the reconfiguration message, is not a member of the current cluster. As described above, multiple nodes can petition for membership in the cluster in a single reconfiguration. Accordingly, the petitioned node can receive more than one reconfiguration message in step 502. For simplification of the following description, it is assumed that only a single node is currently petitioning for membership in the cluster.

Processing transfers to step 504 (FIG. 5) in which CMM 220A (FIG. 3) broadcasts a reconfiguration message to all prospective members of a prospective cluster, which includes all members of the current cluster and the petitioning node. By broadcasting the reconfiguration message, CMM 220A notifies all prospective members of the prospective cluster that node 0 is operational and connected.

In step 506 (FIG. 5), to which processing transfers from step 504, CMM 220A (FIG. 3) waits for a predetermined period of time to receive reconfiguration messages from all prospective members of the prospective cluster excluding the petitioning node since a reconfiguration message was previously received by the petitioned node, e.g., node 0, in step 502 (FIG. 5). Specifically, reconfiguration messages received in step 506 include reconfiguration messages broadcast by other petitioned nodes in analogous, independent performances of step 504. In one embodiment, the predetermined period of time is thirty seconds.

When reconfiguration messages have been received from all prospective members of the prospective cluster have been received by CMM 220A (FIG. 3) or when the predetermined time period expires, whichever occurs first, processing transfers to step 508 (FIG. 5). In step 508, CMM 220A (FIG. 3) stores in next cluster size field 308 and next cluster vector field 310 data which represents a cluster whose membership includes all nodes from which reconfiguration messages are received in step 506 (FIG. 5), including the petitioned node, e.g., node 0. Accordingly, next cluster size field 308 (FIG. 3) and next cluster vector field 310 store data representing a prospective cluster which includes as members all nodes which are operational and which are in communication with the petitioned node.

It is important to note that, since CMM 220A determines which of the nodes of the cluster are connected and functioning in steps 502 (FIG. 5) and 506 and forms the prospective new cluster from these nodes in step 508, multiple nodes can be added to the cluster simultaneously. Thus, in steps 404–408 (FIG. 4) and 502–508 (FIG. 5), all member nodes of a prospective new cluster determine independently which other nodes are operative and in communication with the member nodes to thereby ascertain membership of the new, prospective cluster. Accordingly, multiple nodes can join the cluster simultaneously. It should also be noted that one or more nodes which fail to respond with reconfiguration messages which are therefore not received in independent performances of step 406 (FIG. 4) or step 506 (FIG. 5) by each member of the prospective cluster are excluded from membership in the prospective cluster. Accordingly, a node can join the cluster while another node leaves the cluster in a single reconfiguration of the cluster.

Steps 510–520 are generally analogous to steps 414–424 (FIG. 4) in that the petitioned nodes each determine whether all other members of the prospective cluster are in unanimous agreement with respect to the membership of the prospective cluster. Specifically, processing transfers from step 508 (FIG. 5) to step 510 in which CMM 220A (FIG. 3) broadcasts to all members of the prospective cluster a reconfiguration message which includes data specifying the prospective cluster, i.e., specifying the number and identity of the members of the prospective cluster. In step 512 (FIG. 5), CMM 220A (FIG. 3) waits for a predetermined period of time to receive reconfiguration messages from all members of the prospective cluster. In one embodiment, the predetermined period of time is thirty seconds. When reconfiguration messages are received from all members of the prospective cluster or when the predetermined period of time expires, whichever occurs first, processing transfers to test step 514 (FIG. 5) in which CMM 220A (FIG. 3) begins to determine whether the members of the prospective cluster unanimously agree to the prospective cluster's membership.

In test step 514, CMM 220A (FIG. 3) determines whether a reconfiguration message is received from every member of the prospective cluster in step 512 (FIG. 5). If CMM 220A (FIG. 3) fails to receive a reconfiguration message from any of the members of the prospective cluster during the predetermined time period in step 512 (FIG. 5), processing transfers from test step 514 to step 516. In step 516, the petitioning node is refused membership in the cluster and the cluster remains unchanged, i.e., data stored in next cluster size field 308 (FIG. 3) and next cluster vector field 310 are not moved into cluster size field 304 and cluster vector field 306. After step 516 (FIG. 5), processing according to logic flow diagram 500 terminates.

Conversely, if CMM 220A (FIG. 3) determines in test step 514 (FIG. 5) that reconfiguration messages are received from all members of the prospective cluster, processing transfers from test step 514 to test step 518. In test step 518, CMM 220A (FIG. 3) compares all received reconfiguration messages to determine whether the received reconfiguration messages specify the same cluster specified by the reconfiguration message sent by CMM 220A in step 510 (FIG. 5). If any of the reconfiguration messages specifies a different cluster, agreement regarding new cluster membership is not unanimous and processing transfers to step 516 in which the petitioning node is refused membership in the cluster in the manner described above. Conversely, if all reconfiguration messages specify the same cluster, agreement regarding new cluster membership is unanimous and processing transfer from test step 518 to step 520.

In step 520, the petitioning node is granted membership in the cluster and the prospective cluster is made current by copying data stored in next cluster size field 308 (FIG. 3) and next cluster vector field 310 into cluster size field 304 and cluster vector field 306, respectively. After step 520 (FIG. 5), processing according to logic flow diagram 500 terminates.

Leaving a Cluster

Once a cluster is established, the nodes of the cluster cooperate to distribute processing and carry the distributed processing in a conventional manner and to thereby achieve the efficiencies and benefits associated with distributed processing. On occasion, it is necessary for one or more nodes to leave the cluster. For example, a node may determine that the node can no longer guarantee accurate processing and can voluntarily withdraw from the cluster. Alternatively, a node can fail and that failure can be detected by another node of the cluster to whom the failing node had been sending reconfiguration messages. It should be noted that failure of all communication links between two nodes is detected in the same manner and is therefore processed in the same manner as if the node itself had failed. The node detecting the failure initiates a reconfiguration of the cluster to form a new cluster which does not include any failed nodes. In either case, a node broadcasts a reconfiguration message to all nodes of the cluster.

Removal of a node from the cluster in response to such a reconfiguration message is illustrated by logic flow diagram 600 (FIG. 6) in which processing begins in step 602. All nodes of the cluster perform the steps of logic flow diagram 600 generally concurrently and independently. As described above, all of nodes 0–5 are generally analogous to one another. Therefore, the following description of logic flow diagram 600 in the context of node 0 is equally applicable to performance of the steps of logic flow diagram 600 by any other one of nodes 0–5 (FIG. 1).

In step 602 (FIG. 6), CMM 220A (FIG. 3) of node 0 receives the reconfiguration message. Processing transfers to step 604 (FIG. 6), in which CMM 220A (FIG. 3) broadcasts a reconfiguration message to all nodes in the current cluster, i.e., all nodes identified in cluster vector field 306. CMM 220A of node 0 then waits for a predetermined amount of time to receive reconfiguration messages from all nodes in the current cluster in step 606 (FIG. 6) to determine which of the nodes of the cluster are in communication with node 0 and operational. In one embodiment, the predetermined period of time is thirty seconds.

The node leaving the cluster sends no messages after the reconfiguration message received in step 602. Accordingly, CMM 220A (FIG. 3) does not receive a reconfiguration message from the leaving node in step 606. However, processing is slightly different if one node detects failure of another node and sends a reconfiguration message to form a new cluster which excludes the failed node. In such circumstances, the former, failure-detecting node sends a reconfiguration message in lieu of receiving a reconfiguration message in step 602 (FIG. 6) but performs steps 604–612 in the manner otherwise described herein. Accordingly, the failure-detecting node broadcasts a second reconfiguration message which is received in step 606 such that the failure-detecting node is included in the new, prospective cluster after expulsion of the failed node.

Figure 6:
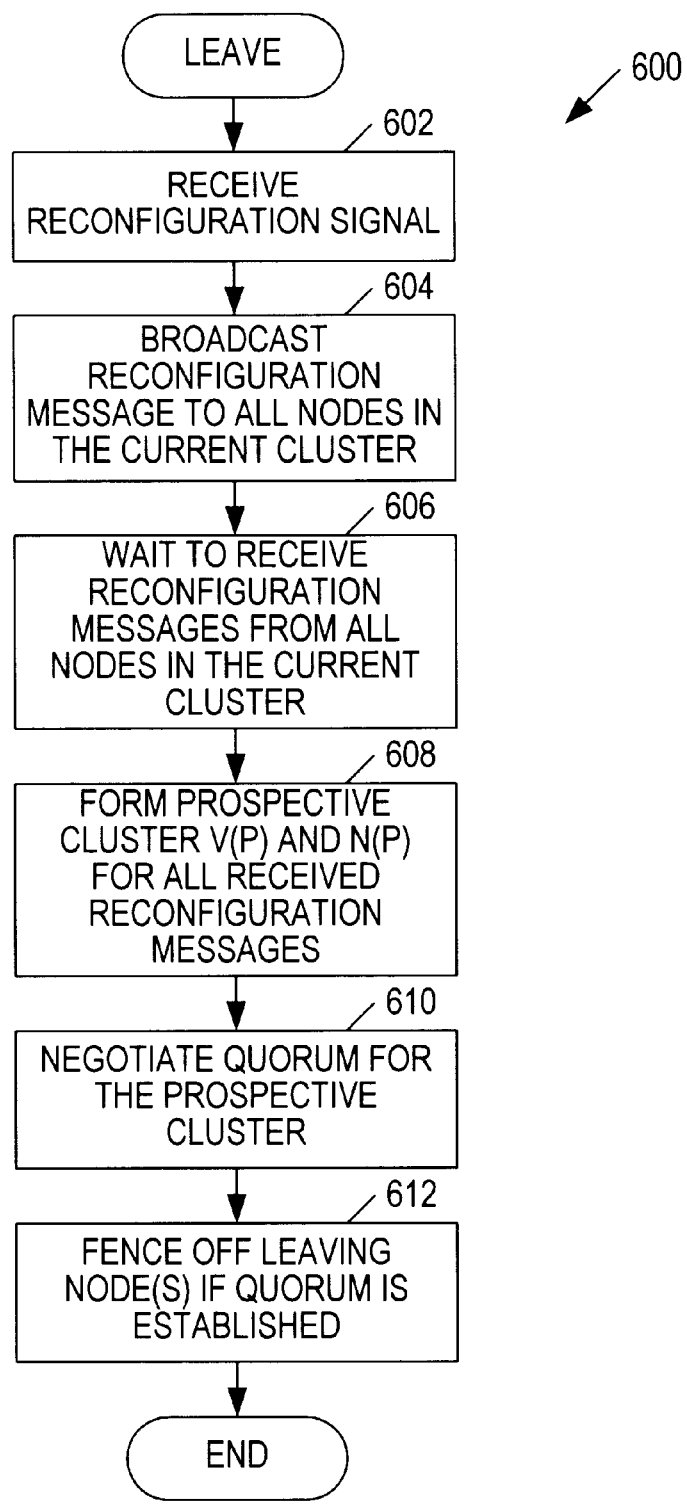
FIG. 6 is a logic flow diagram illustrating the leaving of a node from a cluster in accordance with the present invention.

When CMM 220A (FIG. 3) receives reconfiguration messages from all nodes in the current cluster or when the predetermined amount of time passes, whichever occurs first, processing transfers to step 608 (FIG. 6). In step 608, CMM 220A (FIG. 3) forms a prospective new cluster which includes all nodes from whom CMM 220A receives reconfiguration messages in step 606 (FIG. 6). The prospective new cluster is represented in next cluster size field 308 (FIG. 3) and next cluster vector field 310 of CMM 220A.

It is important to note that, since CMM 220A determines which of the nodes of the cluster are operational and in communication with node 0 in step 606 (FIG. 6) and forms the prospective new cluster from these nodes, multiple nodes can be removed from the cluster simultaneously. In other words, the cluster negotiation mechanism according to the present invention tolerates multiple, simultaneous failures.

From step 608 (FIG. 6), processing transfers to step 610 in which CMM 220A (FIG. 3) negotiates a quorum for the prospective new cluster. Quorum must generally be negotiated because failure of one or more nodes of a cluster can be indistinguishable from a failure of communication links connecting the one or more nodes to the other nodes of the cluster. If a node leaves the cluster due to failure of the node itself, the leaving node generally ceases processing and does not access resources shared with the remainder of the cluster. However, if a node leaves the cluster due to failure of a communication link, the node can continue processing and can corrupt shared resources by failing to coordinate access with other nodes which continue to operate. It is therefore important that member nodes of the prospective new cluster establish a quorum before continuing processing and accessing resources shared with the leaving node or nodes.

Figure 7:
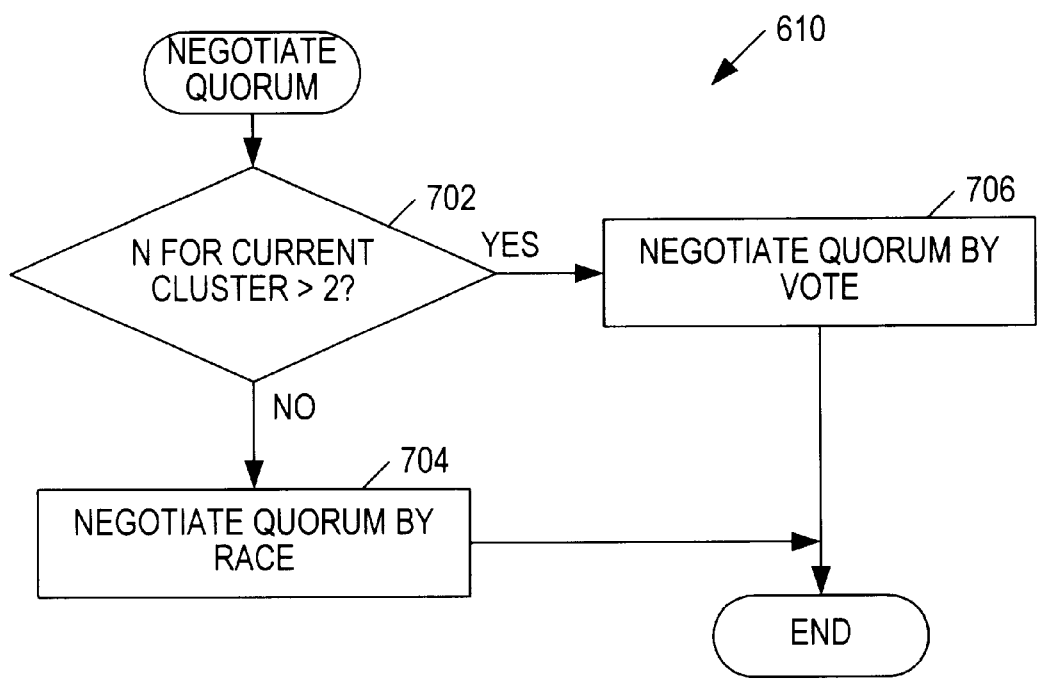
FIG. 7 is a logic flow diagram illustrating negotiation for quorum based on the previously current cluster membership in accordance with the present invention.

Step 610 (FIG. 6) is shown in greater detail as logic flow diagram 610 (FIG. 7) in which processing begins in test step 702. In test step 702, CMM 220A (FIG. 3) determines whether the current cluster, i.e., the cluster from which one or more nodes are leaving, has more than two member nodes by comparison of data stored in cluster size record 304 to data representing a value of two. If the current cluster has no more than two member nodes, processing transfers from test step 702 (FIG. 7) to step 704 in which quorum is negotiated by a race for quorum. Conversely, if the current cluster has more than two member nodes, processing transfers from test step 702 to step 706 in which quorum is negotiated by a vote for quorum. As a result, a two-node cluster negotiates quorum by a quorum race since voting for quorum can lead to uncertain or undesirable results in a two-node cluster, and a cluster with more than two nodes negotiates quorum by a quorum vote since a race for quorum can lead to less than optimum conditions in a larger cluster. Determination of quorum according to each mechanism is described more completely below. After either step 704 or step 706, processing according to logic flow diagram 610, and therefore step 610 (FIG. 6), completes.

From step 610, processing transfers to step 612 in which CMM 220A (FIG. 3), if CMM 220A determines that the prospective new cluster has established a quorum, fences off those former member nodes of the cluster which have not achieved quorum to prevent further processing by such nodes. Specifically, CMM 220A reserves all devices shared with a former member node of the current cluster to prevent access to the shared devices by such a node. After step 610, nodes which left the cluster can no longer access devices shared between such nodes and the member nodes of the new cluster. It is noted, however, that maliciously configured nodes can corrupt devices not shared with any member node of the new cluster.

Quorum by Race

Figure 8:
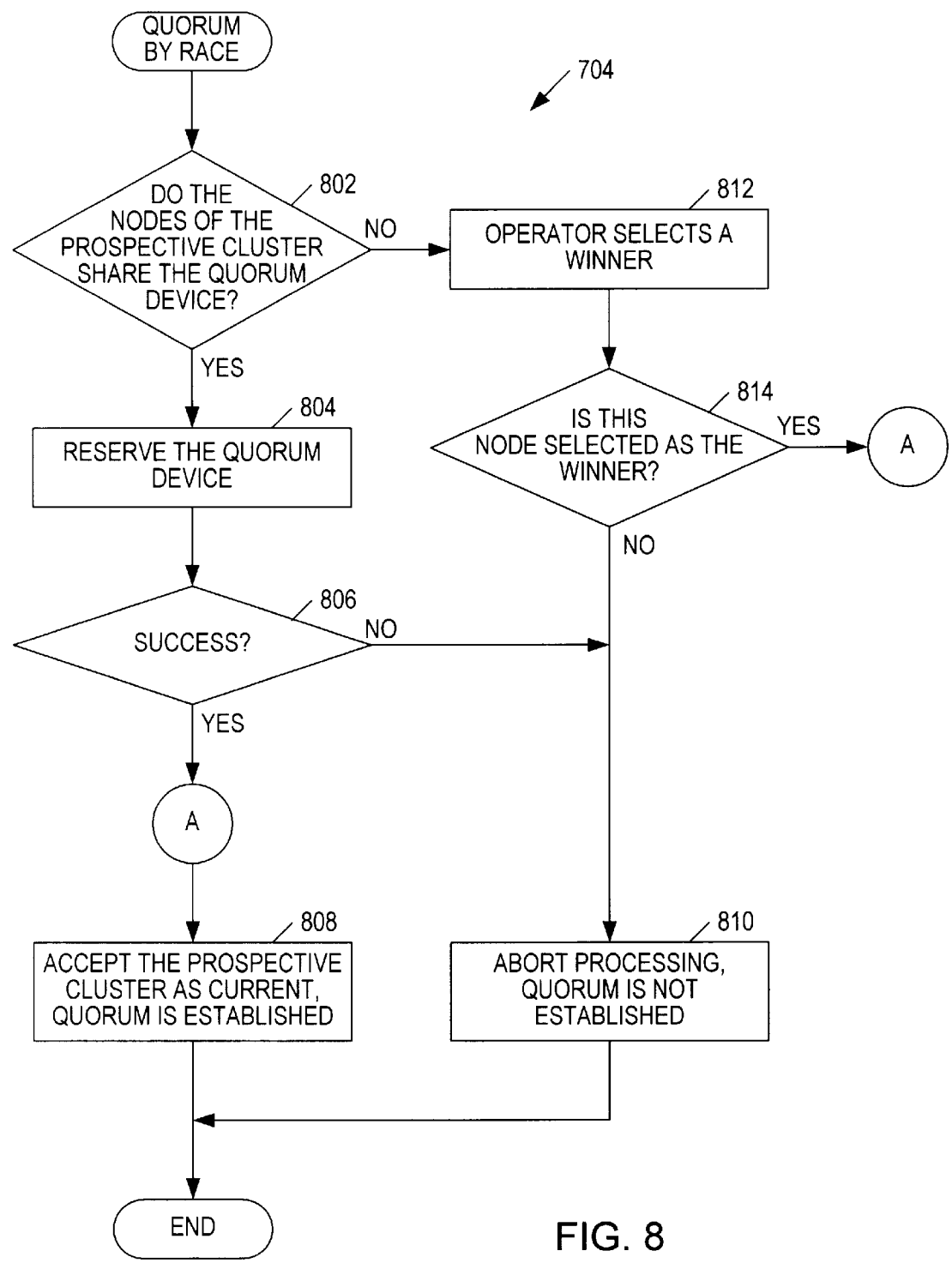
FIG. 8 is a logic flow diagram illustrating a race for quorum in response to one node leaving a cluster having two member nodes.

Determining quorum by a quorum race can be difficult if the two member nodes of the current cluster do not share a quorum device. Step 704 is shown in greater detail as logic flow diagrams 704 (FIG. 8). Performing a quorum race according to logic flow diagram 704 can require human operator intervention.

Processing according to logic flow diagram 704 (FIG. 8) begins in test step 802. In test step 802, CMM 220A (FIG. 3) determines whether the member nodes of the current cluster as represented in cluster vector field 306 share a quorum device. Briefly, a quorum device is a shared device which can be reserved by any of the nodes which share the device and is preselected as a device for use in a quorum race. CMM 220A includes a quorum database 312 which specifies which devices are quorum devices for respective pairs of nodes 0–5. By reference to quorum database 312, CMM 220A determines whether node 0 and the other of the node of the current cluster share a quorum device. If the nodes of the current cluster share a quorum device, the quorum race proceeds with step 804 (FIG. 8). Conversely, if the nodes do not share a quorum device, processing transfers to step 812 which is described below.

In step 804, CMM 220A (FIG. 3) attempts to reserve the quorum device shared with the other node of the current cluster. Such reservation succeeds only if the other node has not already reserved the quorum device in an analogous performance of step 804 (FIG. 8). Processing transfers to test step 806 in which CMM 220A (FIG. 3) determines whether reservation of the quorum device is successful. If the quorum device is successfully reserved in step 804 (FIG. 8), processing transfers from test step 806 to step 808 in which quorum is established and the prospective new cluster is accepted as new by copying the data stored in next cluster size field 308 and next cluster vector field 310 into cluster size field 304 and cluster vector field 306, respectively. After step 808, processing according to logic flow diagram 704A, and therefore step 704 (FIG. 7), terminates.

Conversely, if the quorum device is not successfully reserved in step 804 (FIG. 8), processing transfers from test step 806 to step 810. In step 810, CMM 220A (FIG. 3) aborts processing since quorum is not established. After step 810, processing according to logic flow diagram 704A, and therefore step 704 (FIG. 7), terminates.

As described above, if CMM 220A (FIG. 3) determines in test step 802 (FIG. 8) that the member nodes of the current cluster do not share a quorum device, processing transfers to step 812. In step 812, a human computer operator selects a winner node from the member nodes of the current cluster. CMM 220A (FIG. 3) prompts the human computer operator to select a winner node from a list of member nodes of the current cluster. The human computer operator generates signals identifying the winner node by physical manipulation of user-input devices using conventional user-interface techniques.

Processing transfers to test step 814 (FIG. 8) in which CMM 220A determines whether node 0 is the winner node selected in step 812. If node 0 is selected as the winner node, processing transfers to step 808 in which quorum is established and the prospective new cluster is accepted as current in the manner described above. Otherwise, if node 0 is not selected as the winner node, processing transfers to step 810 in which CMM 220A (FIG. 3) aborts processing since quorum is not established.

Thus, according to logic flow diagram 704 (FIG. 8), quorum is determined by a simple race when the previously current cluster includes only two member nodes and the two member nodes share a quorum device.

Quorum by Vote

Figure 9:
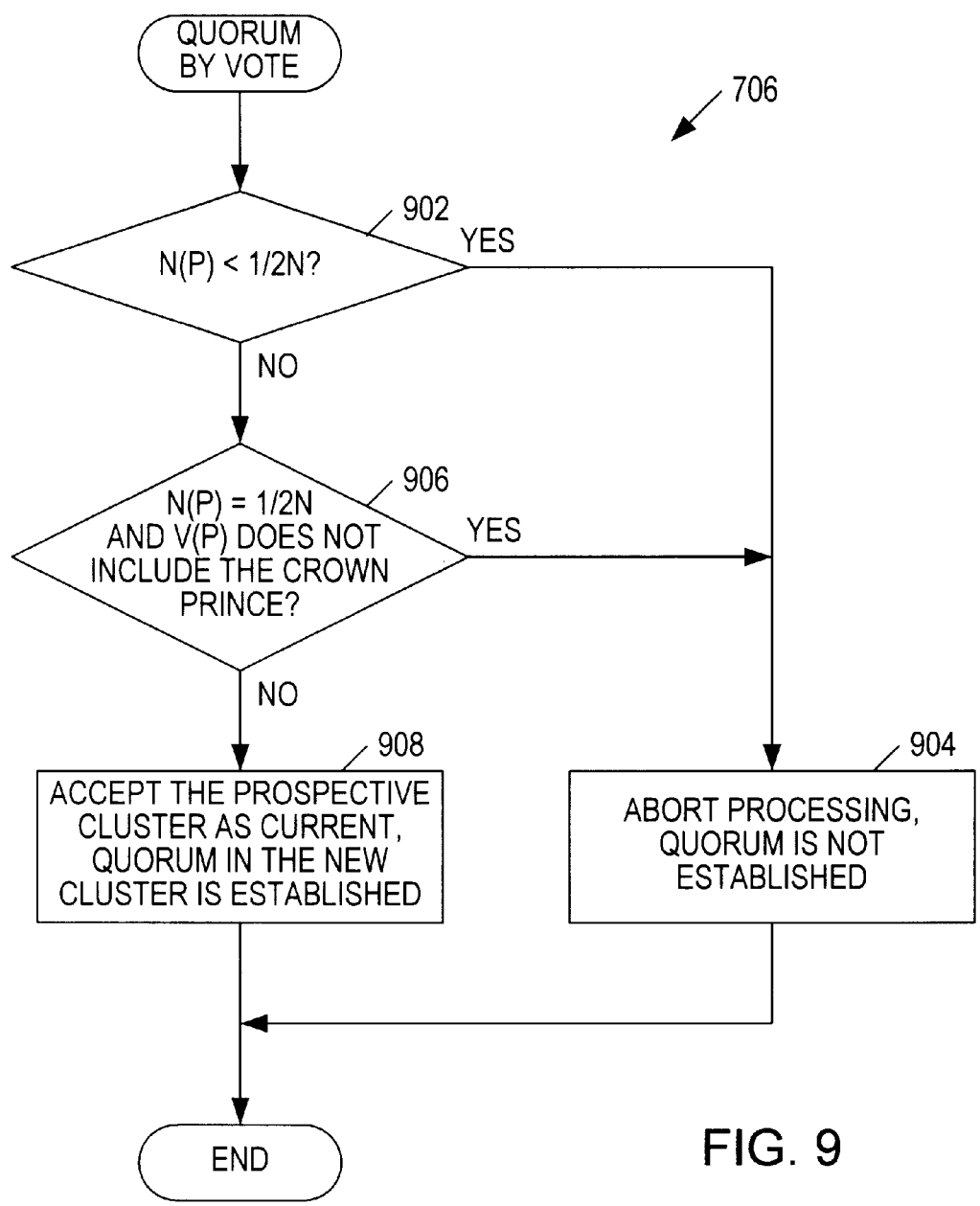
FIG. 9 is a logic flow diagram illustrating a vote for quorum in response to one or more nodes leaving a cluster having more than two member nodes.

In step 706, which is shown in greater detail as logic flow diagram 706 (FIG. 9), CMM 220A (FIG. 3) of node 0, and analogous CMMs of the member nodes of the current cluster, establish quorum by vote. Processing begins in test step 902 (FIG. 9) in which CMM 220A (FIG. 3) compares the number of member nodes in the prospective new cluster as represented in next cluster size record 308 with one-half the number of member nodes in the current cluster as represented in cluster size record 304. If the number of member nodes in the prospective new cluster is less than one-half of the number of member nodes of the current cluster, processing transfers to step 904. Otherwise, processing transfers to test step 906 which is described more completely below. In step 904, the proposed new cluster has not established a quorum and processing by CMM 220A aborts so that resources shared with the leaving node or nodes are not corrupted. After step 904, processing according to logic flow diagram 706, and therefore step 706 (FIG. 7), completes.

In test step 906, CMM 220A (FIG. 3) compares the number of member nodes of the prospective new cluster and one-half of the number of member nodes of the current cluster and determines whether the prospective new cluster includes the crown prince. The crown prince is a selected one of the member nodes of the current cluster. In general, one of the member nodes of each cluster is designated as the crown prince to resolve quorum votes which result in a tie. In one embodiment, the member node with the highest relative priority is designated the crown prince of the cluster. For example, the relative priority of each node can be embedded in the node identifier stored, for example, in identification field 302 (FIG. 3) of CMM 220A. In an illustrative embodiment, each node identifier is a unique number and the numerical value of each node identifier represents a relative priority, the highest of which in a given cluster identifies the crown prince of the cluster. CMM 220A determines whether the prospective new cluster includes the crown prince of the current cluster by comparison of the node identifiers stored in next cluster vector record 310 to the node identifier of the crown prince of the current cluster. If the number of member nodes of the prospective new cluster is equal to one-half the number of member nodes of the current cluster and the prospective new cluster does not include the crown prince of the current cluster, processing transfers to step 904 in which quorum is not established by the prospective new cluster as described above.

Conversely, if (i) the number of members of the prospective new cluster is greater than one-half of the number of member nodes of the current cluster or (ii) (a) the number of members of the prospective new cluster is equal to one-half of the number of member nodes of the current cluster and (b) the prospective new cluster includes the crown prince of the current cluster, processing transfers from test step 906 to step 908. In step 908, the prospective new cluster has established a quorum and CMM 220A (FIG. 3) accepts the prospective new cluster as the current cluster by copying the data stored in next cluster size field 308 and next cluster vector field 310 into cluster size field 304 and cluster vector field 306, respectively. After step 906, processing according to logic flow diagram 706, and therefore step 706, completes.

Thus, in step 706, the member nodes of the prospective new cluster independently and unanimously negotiate quorum by vote with one or more nodes which have left the cluster.

CMM in a Multi-Threaded Environment

Figure 10:
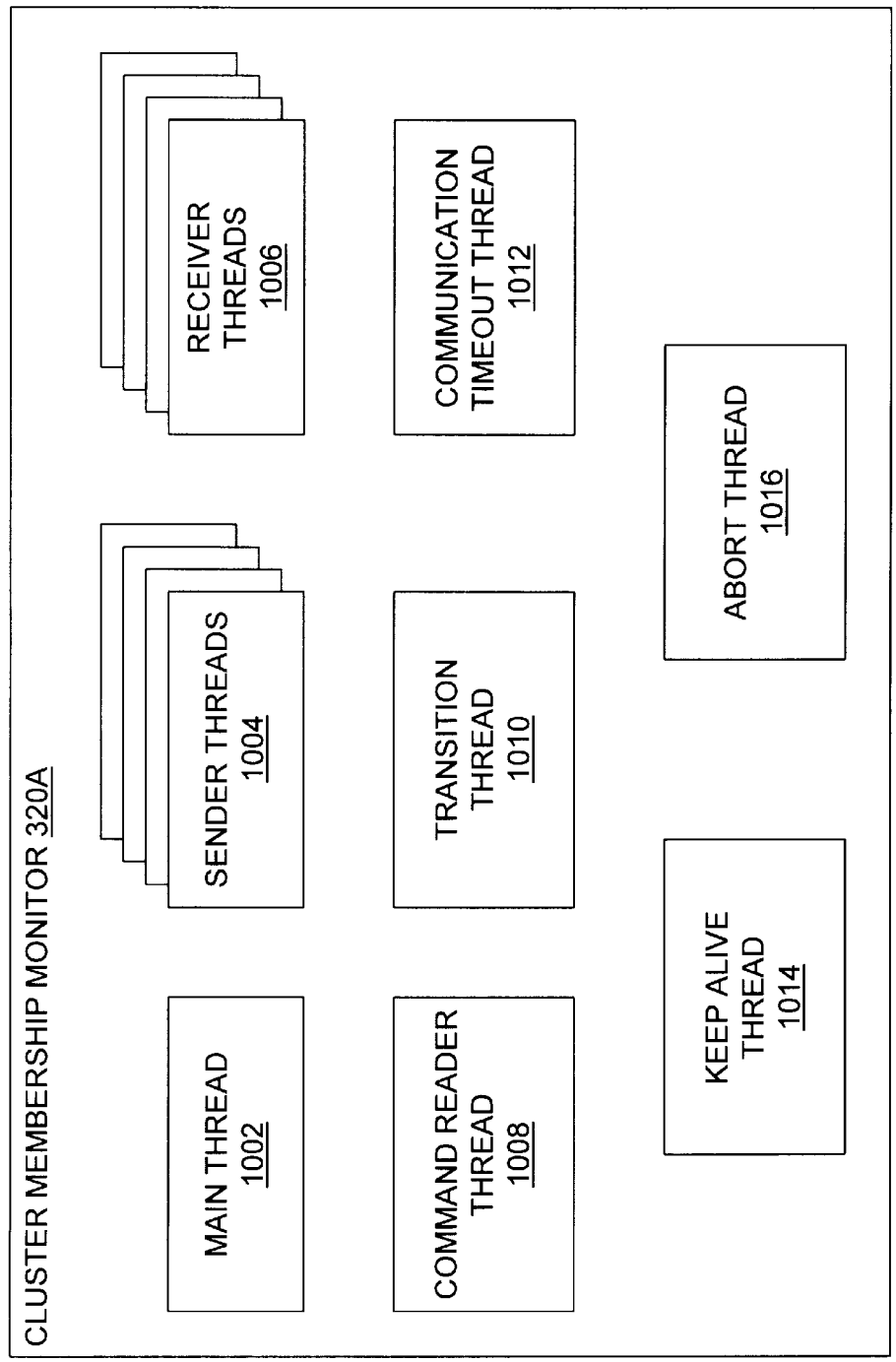
FIG. 10 is a block diagram showing individual threads of the cluster membership monitor of FIG. 3 according to one embodiment.

In one embodiment, CMM 220A (FIG. 3) is a multi-threaded computer process. CMM 220A includes a main thread 1002 (FIG. 10), one or more sender threads 1004, one or more receiver threads 1006, a command reader thread 1008, a transition thread 1010, a communication timeout thread 1012, a keep alive thread 1014, and an abort thread 1016. Main thread 1002 processes state changes of CMM 220A as represented in fields 302–312 in the manner described above and coordinates processing of the other threads of CMM 220A. Sender threads 1004 and receiver threads 1006 send and receive, respectively, reconfiguration messages which indicate to CMM 220A which of the other nodes are operative and in communication with CMM 220A and reconfiguration messages to coordinate reconfiguration of the current cluster. Command reader thread 1008 acts as a remote procedure calling (RPC) server for applications which execute in any member node of the current cluster of which CMM 220A is a member. Transition thread 1010 processes reconfiguration of the current cluster in accordance with logic flow diagrams 400 (FIG. 4), 500 (FIG. 5), and 600 (FIG. 6) and uses sender threads 1004 and receiver threads 1006 to send and receive, respectively, reconfiguration messages in the manner described above. Communication timeout thread 1012 monitors messages received by receiver threads 1006 and detects failure of or, equivalently, loss of communication with a member node of the current cluster. Communication timeout thread 1012 includes global fields 1018 which store data representing respective states of the member nodes of the current cluster. Keep alive thread 1014 generates reconfiguration messages and causes sender threads 1004 to send the reconfiguration messages to respective member nodes of the current cluster. Abort thread 1016 is created when processing by CMM 220A is aborted.

In one embodiment, several of the threads of CMM 220A are implemented in the kernel of the operating system of node 0 to improve performance and to simplify implementation. For example, keep alive thread 1014, communication timeout thread 1012, and receiver threads 1006 can use kernel timeout interrupts to periodically send and receive conventional heartbeat messages to periodically indicate that node 0 is operational and in communication with each of the nodes of the current cluster.

The above description is illustrative only and is not limiting. The present invention is limited only by the claims which follow.

What is claimed is:

1. A method for adding a new node to an existing cluster of a distributed computer system, wherein the existing cluster includes a plurality of existing nodes, said method comprising:

the new node transmitting a reconfiguration petition message to each of the plurality of existing nodes;

each of the plurality of existing nodes transmitting existing cluster configuration information to the new node and to each of the remaining of the plurality of existing nodes in response to the reconfiguration petition message;

each of the plurality of existing nodes transmitting a cluster reconfiguration message specifying a proposed new cluster to the new node and to each of the remaining of the plurality of existing nodes;

the new node transmitting an additional cluster reconfiguration message specifying an additional proposed new cluster to each of the plurality of existing nodes; and each of the plurality of existing nodes and the new node each determining whether the proposed new clusters specified in the cluster reconfiguration messages are equivalent.

2. The method as recited in claim 1 further comprising:

each of the plurality of existing nodes and the new node each storing information which defines a new cluster in response to determining that the proposed new clusters specified in the cluster reconfiguration messages are equivalent.

3. The method as recited in claim 2 further comprising:

each of the plurality of existing nodes restoring information corresponding to said existing cluster in response to determining that the proposed new clusters specified in the cluster reconfiguration messages are not equivalent.

4. The method as recited in claim 1 further comprising:

the new node waiting a predetermined period of time for each of the plurality of existing nodes to respond to the reconfiguration petition message.

5. The method as recited in claim 1 further comprising:

each of the plurality of existing nodes and the new node each independently deriving a corresponding proposed new cluster.

6. The method as recited in claim 5, wherein each of the plurality of existing nodes derives a corresponding proposed new cluster based on the existing cluster configuration information and information identifying said new node.

7. The method as recited in claim 5, wherein the new node derives a corresponding proposed new cluster based on the existing cluster configuration information.

8. A computer readable medium comprising instructions for adding a new node to an existing cluster of a distributed computer system, wherein the existing cluster includes a plurality of existing nodes, wherein the instructions are executable by the distributed computer system to implement a method comprising:

the new node transmitting a reconfiguration petition message to each of the plurality of existing nodes;

each of the plurality of existing nodes transmitting existing cluster configuration information to the new node and to each of the remaining of the plurality of existing nodes in response to the reconfiguration petition message;

each of the plurality of existing nodes transmitting a cluster reconfiguration message specifying a proposed new cluster to the new node and to each of the remaining of the plurality of existing nodes;

the new node transmitting an additional cluster reconfiguration message specifying an additional proposed new cluster to each of the plurality of existing nodes; and each of the plurality of existing nodes and the new node each determining whether the proposed new clusters specified in the cluster reconfiguration messages are equivalent.

9. The computer readable medium as recited in claim 8, wherein the method further comprises:

each of the plurality of existing nodes and the new node each storing information which defines a new cluster in response to determining that the proposed new clusters specified in the cluster reconfiguration messages are equivalent.

10. The computer readable medium as recited in claim 9, wherein the method further comprises:

each of the plurality of existing nodes restoring information corresponding to said existing cluster in response to determining that the proposed new clusters specified in the cluster reconfiguration messages are not equivalent.

11. The computer readable medium as recited in claim 8, wherein the method further comprises:

the new node waiting a predetermined period of time for each of the plurality of existing nodes to respond to the reconfiguration petition message.

12. The computer readable medium as recited in claim 8, wherein the method further comprises:

each of the plurality of existing nodes and the new node each independently deriving a corresponding proposed new cluster.

13. The computer readable medium as recited in claim 12, wherein each of the plurality of existing nodes derives a corresponding proposed new cluster based on the existing cluster configuration information and information identifying said new node.

14. The computer readable medium as recited in claim 12, wherein the new node derives a corresponding proposed new cluster based on the existing cluster configuration information.

15. A distributed computer system comprising:

a plurality of nodes including a plurality of processors and memory;

wherein the memory includes instructions for adding a new node to an existing cluster including a plurality of existing nodes, wherein the instructions are executable by the plurality of nodes to implement a method of:

the new node transmitting a reconfiguration petition message to each of the plurality of existing nodes;

each of the plurality of existing nodes transmitting existing cluster configuration information to the new node and to each of the remaining of the plurality of existing nodes in response to the reconfiguration petition message;

each of the plurality of existing nodes transmitting a cluster reconfiguration message specifying a proposed new cluster to the new node and to each of the remaining of the plurality of existing nodes;

the new node transmitting an additional cluster reconfiguration message specifying an additional proposed new cluster to each of the plurality of existing nodes; and each of the plurality of existing nodes and the new node each determining whether the proposed new clusters specified in the cluster reconfiguration messages are equivalent.

16. The distributed computer system as recited in claim 15, wherein the method further comprises:

each of the plurality of existing nodes and the new node each storing information which defines a new cluster in response to determining that the proposed new clusters specified in the cluster reconfiguration messages are equivalent.

17. The distributed computer system as recited in claim 16, wherein the method further comprises:

each of the plurality of existing nodes restoring information corresponding to said existing cluster in response to determining that the proposed new clusters specified in the cluster reconfiguration messages are not equivalent.

18. The distributed computer system as recited in claim 16, wherein the method further comprises:

the new node waiting a predetermined period of time for each of the plurality of existing nodes to respond to the reconfiguration petition message.

19. The distributed computer system as recited in claim 15, wherein the method further comprises:

each of the plurality of existing nodes and the new node each independently deriving a corresponding proposed new cluster.

20. The distributed computer system as recited in claim 19, wherein each of the plurality of existing nodes derives a corresponding proposed new cluster based on the existing cluster configuration information and information identifying said new node.

21. The distributed computer system as recited in claim 19, wherein the new node derives a corresponding proposed new cluster based on the existing cluster configuration information.

22. A method for adding a new node to an existing cluster of a distributed computer system, wherein the existing cluster includes at least a first node and a second node, said method comprising:

the new node transmitting a reconfiguration petition message to the first node and the second node;

the first node transmitting existing cluster configuration information to the new node and to the second node in response to the reconfiguration petition message;

the second node transmitting existing cluster configuration information to the new node and to the first node in response to the reconfiguration petition message;

the first node transmitting a first cluster reconfiguration message specifying a first proposed new cluster to the new node and to the second node;

the second node transmitting a second cluster reconfiguration message specifying a second proposed new cluster to the new node and to the first node;

the new node transmitting a third cluster reconfiguration message specifying a third proposed new cluster to the first node and the second node; and the first node, the second node, and the new node each determining whether the first proposed new cluster, the second proposed new cluster, and the third proposed new cluster specified in the cluster reconfiguration messages are equivalent.

23. The method as recited in claim 22 further comprising:

the first node, the second node, and the new node each storing information which defines a new cluster in response to determining that the first proposed new cluster, the second proposed new cluster, and the third proposed new cluster specified in the cluster reconfiguration messages are equivalent.

24. The method as recited in claim 23 further comprising:

the first node and the second node restoring information corresponding to said existing cluster in response to determining that the first proposed new cluster, the second proposed new cluster, and the third proposed new cluster specified in the cluster reconfiguration messages are not equivalent.

25. The method as recited in claim 22 further comprising:

the new node waiting a predetermined period of time for the first node and the second node to respond to the reconfiguration petition message.

26. The method as recited in claim 22 further comprising:

the first node deriving the first proposed new cluster independent of the second and third proposed new clusters;

the second node deriving the second proposed new cluster independent of the first and third proposed new clusters; and the new node deriving the third proposed new cluster independent of the first and second proposed new clusters.

27. The method as recited in claim 26, wherein the first node derives the first proposed new cluster depending upon the existing cluster configuration information and information identifying said new node.

28. The method as recited in claim 26, wherein the second node derives the second proposed new cluster depending upon the existing cluster configuration information and information identifying said new node.

29. The method as recited in claim 26, wherein the new node derives the third proposed new cluster depending upon the existing cluster configuration information.

30. A computer readable medium comprising instructions for adding a new node to an existing cluster of a distributed computer system, which includes at least a first node and a second node, wherein the instructions are executable by the distributed computer system to implement a method comprising:

the new node transmitting a reconfiguration petition message to the first node and the second node;

the first node transmitting existing cluster configuration information to the new node and to the second node in response to the reconfiguration petition message;

the second node transmitting existing cluster configuration information to the new node and to the first node in response to the reconfiguration petition message;

the first node transmitting a first cluster reconfiguration message specifying a first proposed new cluster to the new node and to the second node;

the second node transmitting a second cluster reconfiguration message specifying a second proposed new cluster to the new node and to the first node;

the new node transmitting a third cluster reconfiguration message specifying a third proposed new cluster to the first node and the second node; and the first node, the second node, and the new node each determining whether the first proposed new cluster, the second proposed new cluster, and the third proposed new cluster specified in the cluster reconfiguration messages are equivalent.

31. The computer readable medium as recited in claim 30, wherein the method further comprises:

the first node, the second node, and the new node each storing information which defines a new cluster in response to determining that the first proposed new cluster, the second proposed new cluster, and the third proposed new cluster specified in the cluster reconfiguration messages are equivalent.

32. The computer readable medium as recited in claim 31, wherein the method further comprises:

the first node and the second node restoring information corresponding to said existing cluster in response to determining that the first proposed new cluster, the second proposed new cluster, and the third proposed new cluster specified in the cluster reconfiguration messages are not equivalent.

33. The computer readable medium as recited in claim 30, wherein the method further comprises:

the new node waiting a predetermined period of time for the first node and the second node to respond to the reconfiguration petition message.

34. The computer readable medium as recited in claim 30, wherein the method further comprises:

the first node deriving the first proposed new cluster independent of the second and third proposed new clusters;

the second node deriving the second proposed new cluster independent of the first and third proposed new clusters; and the new node deriving the third proposed new cluster independent of the first and second proposed new clusters.

35. The computer readable medium as recited in claim 34, wherein the first node derives the first proposed new cluster depending upon the existing cluster configuration information and information identifying said new node.

36. The computer readable medium as recited in claim 35, wherein the second node derives the second proposed new cluster depending upon the existing cluster configuration information and information identifying said new node.

37. The computer readable medium as recited in claim 36, wherein the new node derives the third proposed new cluster depending upon the existing cluster configuration information.

38. A distributed computer system comprising:

a plurality of nodes including a plurality of processors and memory;

wherein the plurality of nodes includes at least a first node coupled to a second node, and a new node coupled to the second node;

wherein the memory includes instructions for adding the new node to an existing cluster including said first node and second node;

wherein the instructions are executable by the plurality of nodes to implement a method of:

the new node transmitting a reconfiguration petition message to the first node and the second node;

the first node transmitting existing cluster configuration information to the new node and to the second node in response to the reconfiguration petition message;

the second node transmitting existing cluster configuration information to the new node and to the first node in response to the reconfiguration petition message;

the first node transmitting a first cluster reconfiguration message specifying a first proposed new cluster to the new node and to the second node;

the second node transmitting a second cluster reconfiguration message specifying a second proposed new cluster to the new node and to the first node;

the new node transmitting a third cluster reconfiguration message specifying a third proposed new cluster to the first node and the second node; and the first node, the second node, and the new node each determining whether the first proposed new cluster, the second proposed new cluster, and the third proposed new cluster specified in the cluster reconfiguration messages are equivalent.

39. The distributed computer system as recited in claim 38, wherein the method further comprises:

the first node, the second node, and the new node each storing information which defines a new cluster in response to determining that the first proposed new cluster, the second proposed new cluster, and the third proposed new cluster specified in the cluster reconfiguration messages are equivalent.

40. The distributed computer system as recited in claim 39, wherein the method further comprises:

the first node and the second node restoring information corresponding to said existing cluster in response to determining that the first proposed new cluster, the second proposed new cluster, and the third proposed new cluster specified in the cluster reconfiguration messages are not equivalent.

41. The distributed computer system as recited in claim 38, wherein the method further comprises:

the new node waiting a predetermined period of time for the first node and the second node to respond to the reconfiguration petition message.

42. The distributed computer system as recited in claim 38, wherein the method further comprises:

the first node deriving the first proposed new cluster independent of the second and third proposed new clusters;

the second node deriving the second proposed new cluster independent of the first and third proposed new clusters; and the new node deriving the third proposed new cluster independent of the first and second proposed new clusters.

43. The distributed computer system as recited in claim 42, wherein the first node derives the first proposed new cluster depending upon the existing cluster configuration information and information identifying said new node.

44. The distributed computer system as recited in claim 42, wherein the second node derives the second proposed new cluster depending upon the existing cluster configuration information and information identifying said new node.

45. The distributed computer system as recited in claim 42, wherein the new node derives the third proposed new cluster depending upon the existing cluster configuration information.

* * * * *